United States Patent [19]

Mandell

[11] 4,289,417
[45] Sep. 15, 1981

[54] CLAMP

[76] Inventor: Kenneth H. Mandell, 19 Pomona Ave., Long Beach, Calif. 90803

[21] Appl. No.: 146,446

[22] Filed: May 5, 1980

Related U.S. Application Data

[63] Continuation-in-part of Ser. No. 64,038, Aug. 6, 1979, abandoned.

[51] Int. Cl.³ .............................................. F16D 1/00
[52] U.S. Cl. ..................................... 403/218; 403/400
[58] Field of Search ............... 403/391, 400, 169, 218; 24/81 CR; 248/229

[56] References Cited

U.S. PATENT DOCUMENTS

| | | |
|---|---|---|
| 2,044,700 | 6/1936 | Jones . |
| 2,101,317 | 12/1937 | Lemieux . |
| 2,494,826 | 1/1950 | Mulder . |
| 2,638,301 | 5/1953 | Smith . |
| 2,891,296 | 6/1959 | Darde . |
| 3,103,352 | 9/1963 | Steffen . |
| 3,861,816 | 1/1975 | Zaidan . |
| 4,077,730 | 3/1978 | Zaidan . |

FOREIGN PATENT DOCUMENTS

| | | | |
|---|---|---|---|
| 604997 | 11/1934 | Fed. Rep. of Germany | 248/229 |
| 1441345 | 4/1966 | France | 403/400 |
| 225758 | 12/1924 | United Kingdom | 403/385 |
| 1043362 | 9/1966 | United Kingdom | 24/81 CR |

Primary Examiner—Andrew V. Kundrat
Attorney, Agent, or Firm—Fulwider, Patton, Rieber, Lee & Utecht

[57] ABSTRACT

A clamp having a body characterized by a pair of laterally open, V-shape seats extending along axes disposed in spaced apart, right angular relation. Opposite the seats are threaded openings which receive threaded screws lying along axes intersecting the apices of the V-shape seats, respectively, to engage a pair of structural elements resting upon the seats. Various sizes of rods and tubes can be secured together by the clamp in spaced apart, right angular relation. One version of the clamp provides a third seat for mounting of three structural elements by the clamp.

3 Claims, 17 Drawing Figures

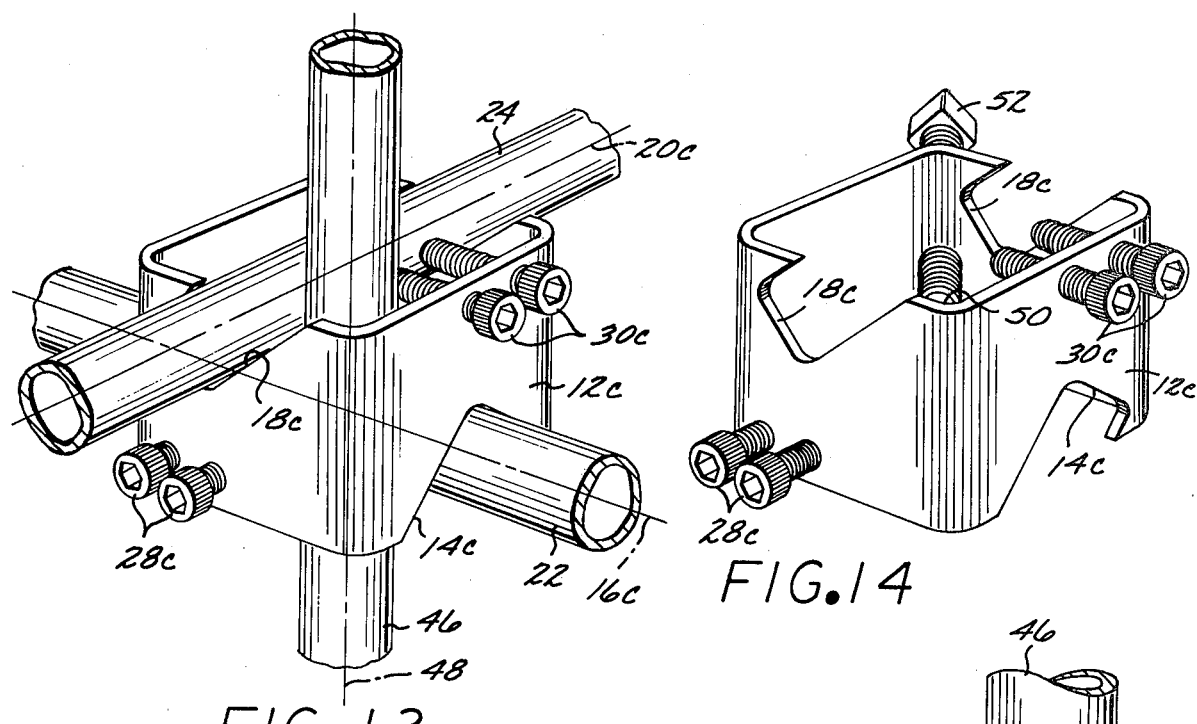
FIG.13
FIG.14
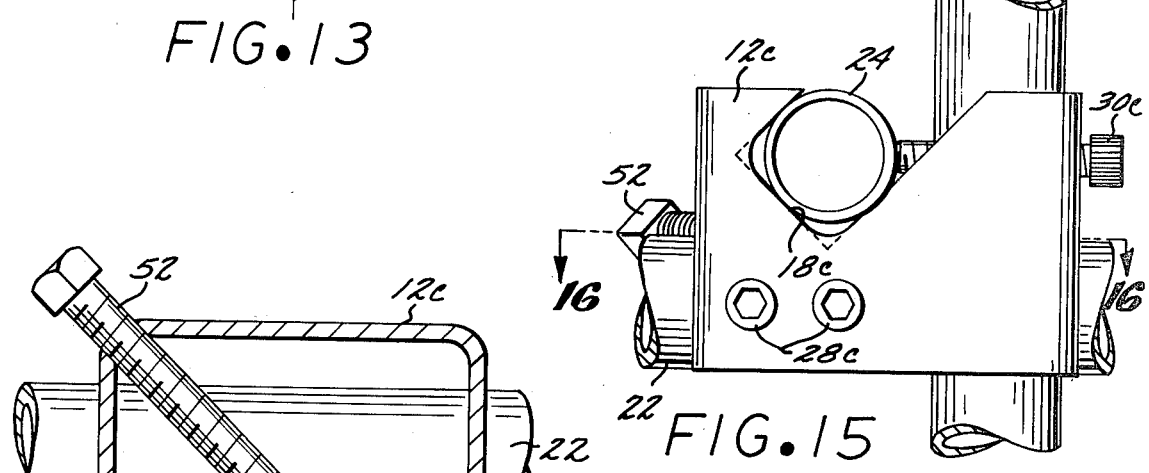
FIG.15
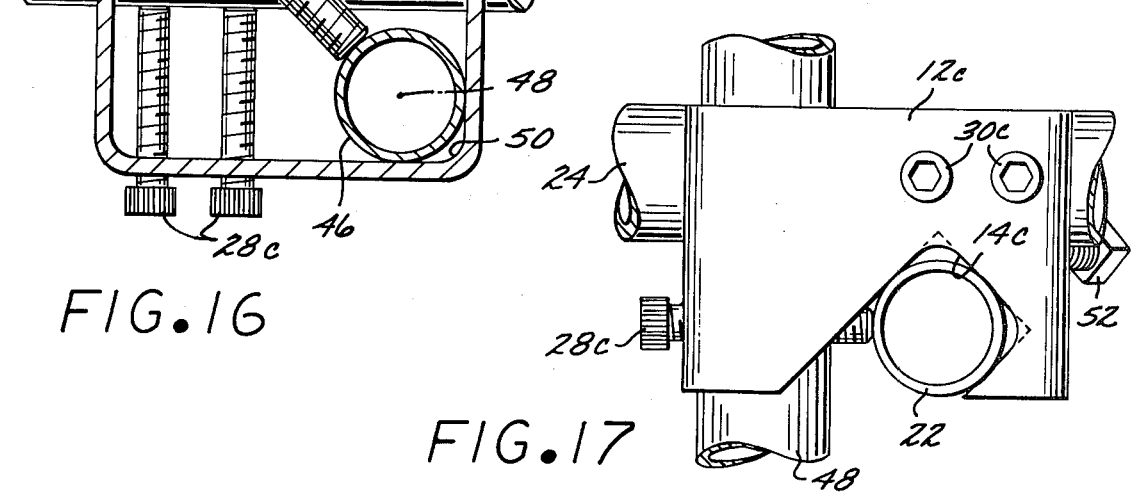
FIG.16
FIG.17

CLAMP

CROSS-REFERENCE TO RELATED APPLICATION

This is a continuation-in-part of applicant's copending application, Ser. No. 64,038, filed Aug. 6, 1979, entitled "Clamp", and now abandoned.

BACKGROUND OF THE INVENTION

1. Field of the Invention

The present invention relates to clamps, and more particularly to structural clamps adapted to secure various sizes and types of elongated structural elements in spaced apart, right angular relation.

2. Description of the Prior Art

Prior art clamps for fixing structural elements in right angular relation are typically made in various sizes to accommodate different elements to be clamped. They are also made in different configurations for handling elements of circular, square, hexagonal, and other cross sections. Consequently, a considerable number of different clamps must be stocked in order to be prepared for various job situations. This problem is encountered, for example, in the construction of building scaffolding, the erection of display frames, and the assembly of support frames for laboratory equipment.

Even where properly sized or configured for a job, many clamps of the prior art cannot be laterally loaded. Instead, the structural elements must be inserted in the clamps endwise or longitudinally, an awkward and time-consuming task. Sometimes endwise insertion is impossible such as when the element is relatively long or mounts an element at one end which is too large to pass through the clamp.

SUMMARY OF THE INVENTION

According to the present invention, a clamp is provided which includes a clamp body having a pair of seats extending along adjacent, spaced apart, right angularly related axes, and further having portions defining openings opposite the seats to accommodate a pair of clamping means such as threaded screws. The screws are adapted to engage structural elements disposed upon the seats. Each seat is configured to accommodate various sizes and shapes of structural element, and each clamping screw preferably extends along an axis which intersects the base of the seat. In addition, the clamp can be configured to provide a third seat for a third structural element.

Other objects and features of the present invention will become apparent from consideration of the following detailed description taken in connection with the accompanying drawings.

BRIEF DESCRIPTION OF THE DRAWINGS

FIG. 13 is a perspective view of a third form of clamp, according to the present invention;

FIG. 14 is a perspective view similar to FIG. 13 but illustrating three structural elements held by the clamp in adjacent, right angular relation;

FIG. 15 is a front elevational view of the clamp of FIG. 13;

FIG. 16 is a view taken along the line 16—16 of FIG. 15; and

FIG. 17 is a right side elevational view of the clamp of FIG. 13.

DESCRIPTION OF THE PREFERRED EMBODIMENTS

Figure 1:
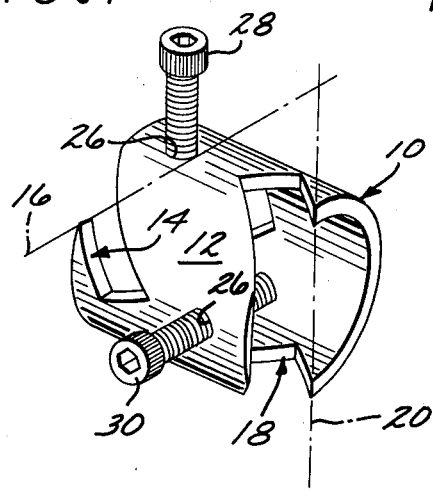
FIG. 1 is a perspective view of a clamp having a cylindrical body, according to the present invention.

Referring now to the drawings and particularly to FIGS. 1 through 6, there is illustrated a clamp 10 according to the present invention. The clamp 10 comprises, generally, a body 12 having a first seat 14 extending along a first axis 16, and a second seat 18 extending along a second axis 20. Axis 20 is disposed in spaced, right angular relation to axis 16.

The seats 14 and 18 are adapted to receive a pair of elongated structural elements, such as lengths 22 and 24 of round tubing. Body 12 further includes a pair of openings 26 opposite the seats 14 and 18 for receiving a pair of clamping means in the form of machine screws 28 and 30. The screws are adapted to be threaded into and out of engagement with the tubing lengths 22 and 24.

Although it could be made out of a solid section of material, body 12 is conveniently formed out of a short section of hollow cylindrical material whereby each of the seats 14 and 16 is defined by diametrically opposite wall portions of the body 12.

Figure 11:
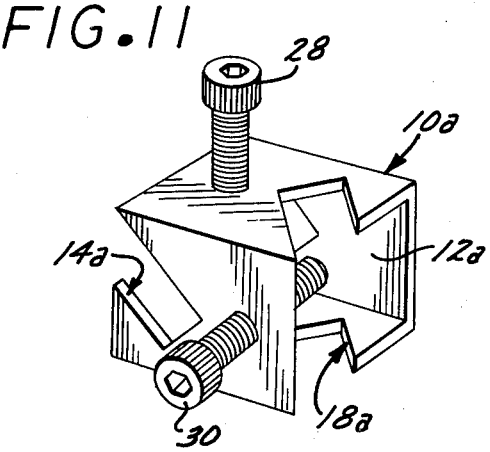
FIG. 11 is a perspective view of a third form of clamp according to the present invention.
Figure 12:
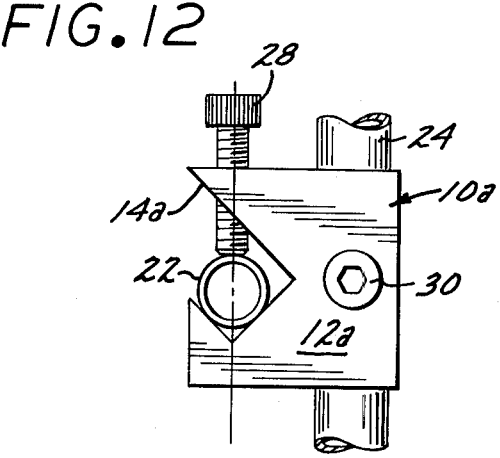
FIG. 12 is a front elevational view of the clamp of FIG. 11, illustrating the clamping of a pair of structural elements in spaced, intersecting relation.

The body 12 can also be made out of square tubing, as seen in FIGS. 11 and 12. In all respects the function of the clamp of FIGS. 11 and 12 is identical to that of the clamp 10 of FIGS. 1 through 6. Identical elements of the two embodiments are assigned identical numbers, while those elements which are not identical, but which are generally similar, are assigned identical numbers with the subscript "a".

Figure 2:
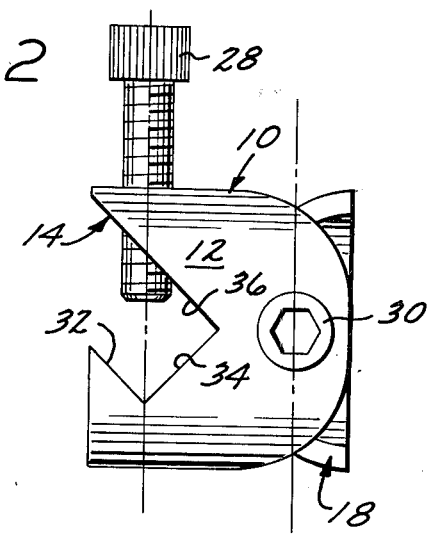
FIG. 2 is a left side elevational view of the clamp of FIG. 1.
Figure 3:
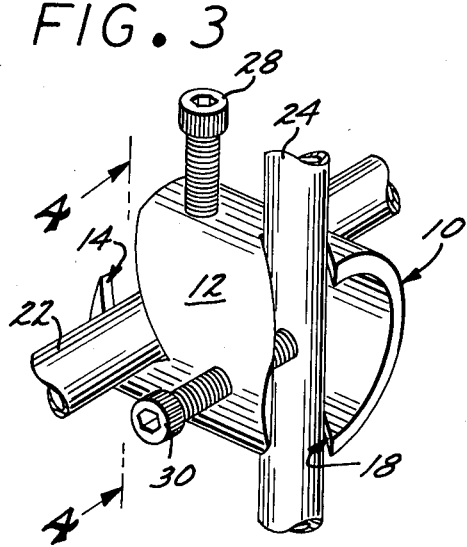
FIG. 3 is a perspective view similar to FIG. 1, but illustrating the clamp mounting a pair of structural elements in adjacent spaced apart, right angular relation.
Figure 4:
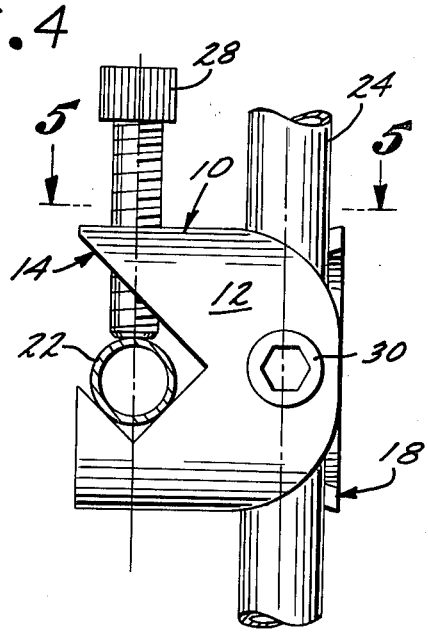
FIG. 4 is a view taken along the line 4—4 of FIG. 3.
Figure 5:
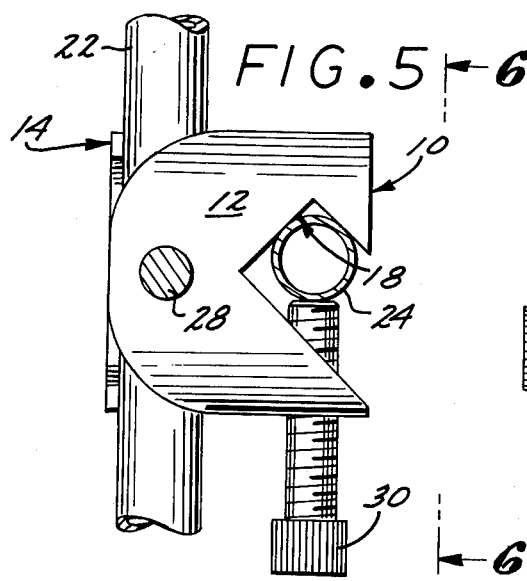
FIG. 5 is a view taken along the line 5—5 of FIG. 4.
Figure 6:
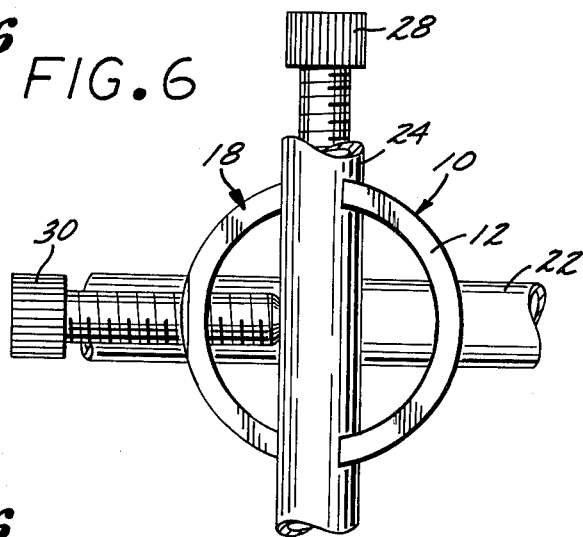
FIG. 6 is a view taken along the line 6—6 of FIG. 5.
Figure 7:
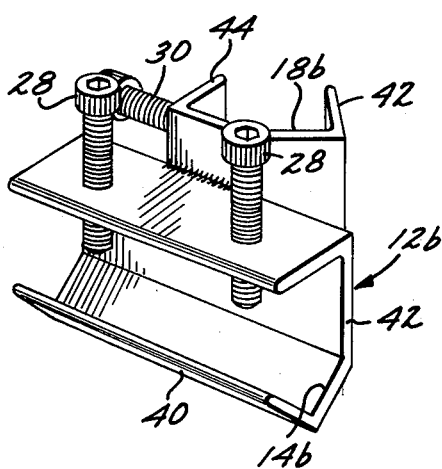
FIG. 7 is a perspective view of a second form of clamp, according to the present invention.
Figure 8:
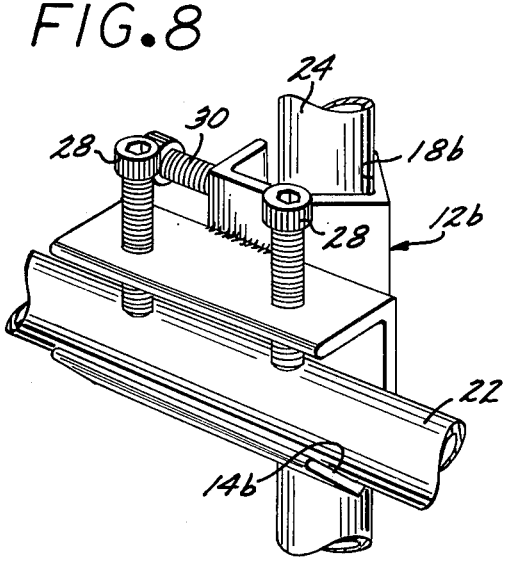
FIG. 8 is a perspective view similar to FIG. 7, but illustrating a pair of structural elements held by the clamp in adjacent spaced apart, right angular relation.
Figure 9:
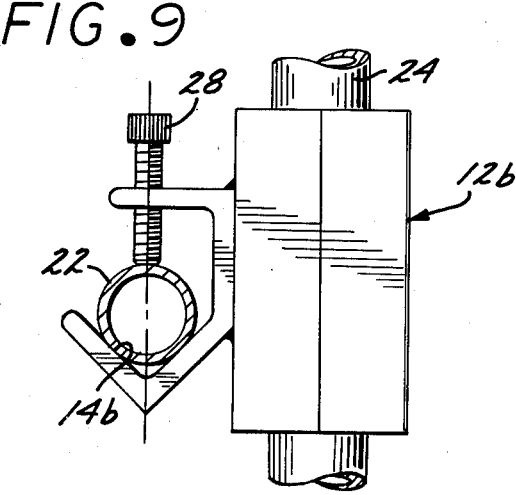
FIG. 9 is a right side elevational view of the clamp and structural elements of FIG. 8.
Figure 10:
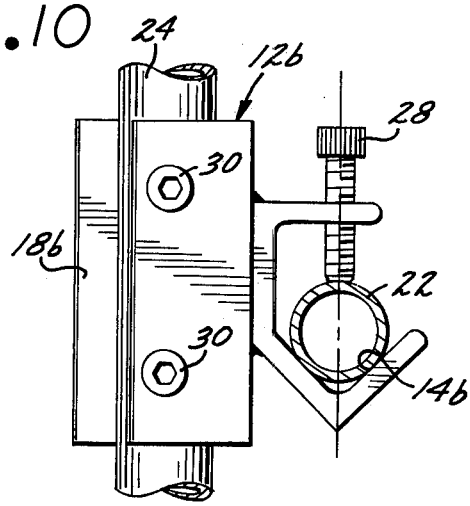
FIG. 10 is a left side elevational view of the clamp and structural elements of FIG. 8.

With reference to the first embodiment, as best seen in FIG. 2, each of the seats 14 and 18 is characterized by sloping, right angular edges of sides 32 and 34 which intersect an apex to define a V-shape. Various diameters of round tubing lengths 22 can be received upon the seats 14 and 18, depending upon the length of the sides 32 and 34. The side lengths, of course, are a function of the diameter of the stock utilized to form the body 12. Regardless of the tubing diameter, the centerline of the tubing is generally in alignment with the apex of the V-shape seat, and generally in alignment with the centerline of the associated machine screw 28. Consequently, tightening of the screw 28 urges the tubing length 22, whatever its diameter, directly toward the apex of the seat, thereby constraining the tubing length 22 against lateral movement out of the seat. It will be apparent that the V-shape seat is also adapted to receive a structural element of square or other cross section, if desired.

Each of the seats 14 and 18 is laterally open to enable lateral loading of the tubing lengths 22 and 24 onto the seats 14 and 18. For this purpose, as seen in FIG. 2, the side 32 of the seat 14 extends outwardly and terminated at one end of the body 12. The other side 34 of the seat is intersected at a right angle by a side 36 which is parallel to and in confronting relation to the side 32. Thus, both of the sides 32 and 36 extend outwardly to the end of the body 12, making the seat 14 laterally open for lateral receipt of the tubing lengths. This arrangement greatly facilitates rapid assembly and securement of the tubing lengths 22 and 24 in adjacent, spaced apart, right angular relation, as required in many scaffolding and framing applications.

The thickness and extent of the body 12 overlying each seat 14 and 18 is ample to bear the loading imposed upon it upon tightening of the associated screw 28.

The apex or V of each seat 14 or 18 could be rounded, if desired, or even made arcuate. The radius should be smaller than the smallest tubing length to be accommodated. The bottom of the seat is thus not contacted by the tubing length and a centering effect of the tubing length is provided. However, the V-shape seat is generally easier to form and it also provides this centering effect. The sides 32 and 34 need not be right angularly related, so long as they slope toward one another and thereby accommodate structural shapes of different cross-sectional sizes.

As will be apparent to those skilled in the art, clamping means other than the screws 28 and 30 may be utilized, so long as they function to apply sufficient force upon the tubing length to urge it onto the associated seat. As illustrated, the axis of screw 28 is preferably parallel to the tubing length 24, while that of screw 30 is parallel to the tubing length 22.

In operation of the clamp 10, a pair of structural elements such as the tubing lengths 22 and 24 are quickly loaded laterally onto the seats 14 and 18, and the machine screws 28 and 30 are tightened to secure the elements in adjacent, spaced apart relation. Similar clamps 10 are similarly loaded to effect rapid assembly of a scaffold, frame or the like. The clamps securely hold the structural elements in precise, right angular relation, and the seats are adapted to receive various sizes and configurations of structural elements.

Another embodiment of the present clamp is illustrated in FIGS. 7 through 12. Parts identical to the embodiment of FIGS. 1 through 6 are assigned identical numbers, while parts which are not identical but which have similar functions are assigned the same number with the letter "b".

The clamp body 12b is particularly useful in building frames of heavy pipe. It is inexpensively formed by welding or otherwise rigidly securing together four structural angles. The V-shape seat 14b is formed by an angle 40 which is welded at its longitudinal edge to the corresponding edge of another angle 42. The angle 42 overlies the seat 14b and threadably carries a pair of machine screws 28 whose centerlines are generally aligned with the apex of the seat 14b.

Another pair of angles 42 and 44 are similarly welded together to form the seat 18b. The pair of welded angles 40 and 42 are welded or otherwise rigidly connected to the welded angles 42 and 44 in right angular relation to form the unitary clamp body 12b.

Another embodiment of the present clamp is illustrated in FIGS. 13 through 17. Parts identical to the embodiment of FIGS. 1 through 6 are assigned identical numbers, while parts which are not identical but which have similar functions are assigned the same number with the subscript "c".

The clamp body 12c is made of square tubing or the like and is particularly useful in clamping three structural elements 22, 24, and 46 in adjacent, spaced-apart and right-angular relationship along axes 16c, 20c, and 48, respectively.

The seats 14c and 18c for the elements 22 and 24 are substantially identical to the corresponding seats of the embodiments of FIGS. 1 through 6, except that the inner corners of the seats are slightly rounded to provide fillets for stress relief. In addition, rather than clamping means in the form of single screws, the body 12c includes pairs of threaded openings opposite each of the seats to receive clamping means in the form of pairs of machine screws 28c and 30c, respectively, for engagement with the structural elements 22 and 24.

The square section of the body 12c is characterized by four inner corners, it being noted that two diagonally opposite ones of these corners include the pairs of openings through which the pairs of machine screws 28c and 30c are disposed. One of the other pair of diagonally opposite corners constitutes a seat 50 which, like the seats 14 and 18 of the first embodiment, is characterized by sloping, right angular edges or sides which intersect to define a generally V-shaped apex or corner. The structural element 46 is arranged parallel to the seat 50, as best seen in FIG. 16, with the centerline of the element 48 generally aligned with the seat 50.

An elongated machine screw 52 is disposed through a suitable threaded opening provided in the corner of the body 12c diagonally opposite the seat 50. Tightening of the screw 52 urges the element 46 toward the apex or corner of the seat 50.

The embodiment of FIGS. 13 and 17 is thus uniquely adapted to clamp three structural elements in right angular relationship.

From the foregoing, it will be apparent that the various embodiments of the present clamp 12 provide an inexpensive and easy means for quickly and precisely assembling structural elements of various sizes and configurations in adjacent, spaced apart, and right angular relationship.

Various modifications and changes may be made with regard to the foregoing detailed description without departing from the spirit of the invention.

I claim:
1. A clamp for mounting a plurality of elongated structural elements in spaced apart, right angular relation, said clamp comprising:
   a tubular clamp body of rectangular cross section having a first seat formed in opposite walls of said clamp body and extending along a first axis, and a second seat formed in opposite walls of said clamp body and extending along a second axis in spaced, right angular relation to said first axis, said first and second seats being laterally open for receipt, respectively, of a pair of elongated structural elements, said clamp body further having a third seat defined by an inner corner of said clamp body and extending along a third axis in spaced, right angular relation to said first and second axes, said clamp body including openings opposite said first, second and third seats for receiving clamping means respectively, for engagement with said structural elements, respectively, for urging said structural elements against said seats.

2. A clamp according to claim 1 wherein said first and second seats are each characterized by sloping sides intersecting in a V-shape configuration whereby said first and second seats are adapted to receive structural elements of square cross section, and each of said clamping means comprises an elongated member threaded into one of said openings along an axis perpendicular to the associated one of said first, second and third axes.

3. A clamp according to claim 2 wherein said axes of said members intersect the apices of said V-shape first and second seats, respectively, whereby said members are constrained against sliding off structural elements of relatively small cross section.

* * * * *

UNITED STATES PATENT AND TRADEMARK OFFICE
CERTIFICATE OF CORRECTION

PATENT NO. : 4,289,417
DATED : Sept. 15, 1981
INVENTOR(S) : Kenneth H. Mandell

It is certified that error appears in the above—identified patent and that said Letters Patent is hereby corrected as shown below:

Column 2, line 59, "of." should read -- or --

Signed and Sealed this

Sixteenth Day of February 1982

[SEAL]

Attest:

GERALD J. MOSSINGHOFF

Attesting Officer     Commissioner of Patents and Trademarks